Oct. 21, 1924.
W. FISCHER
TAKE-UP DEVICE
Filed Aug. 7, 1923
1,512,838
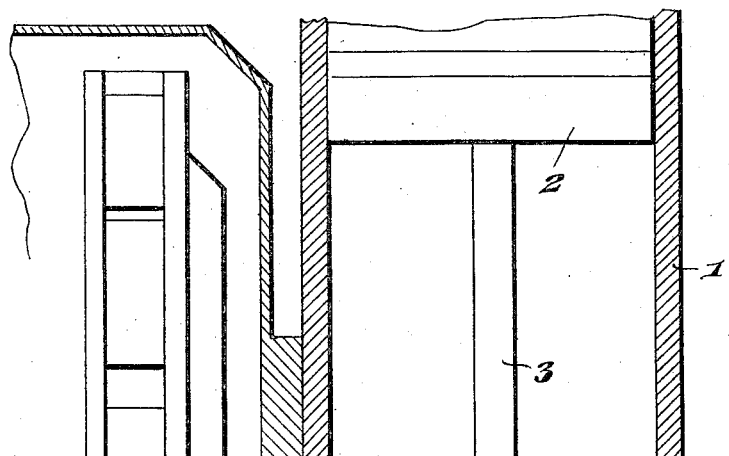
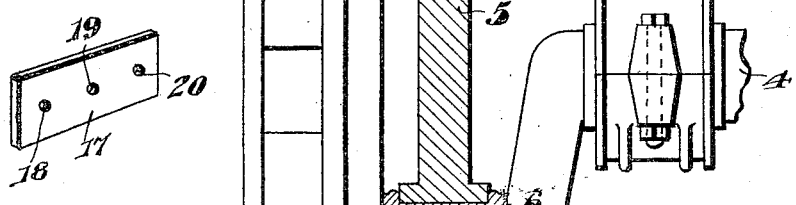
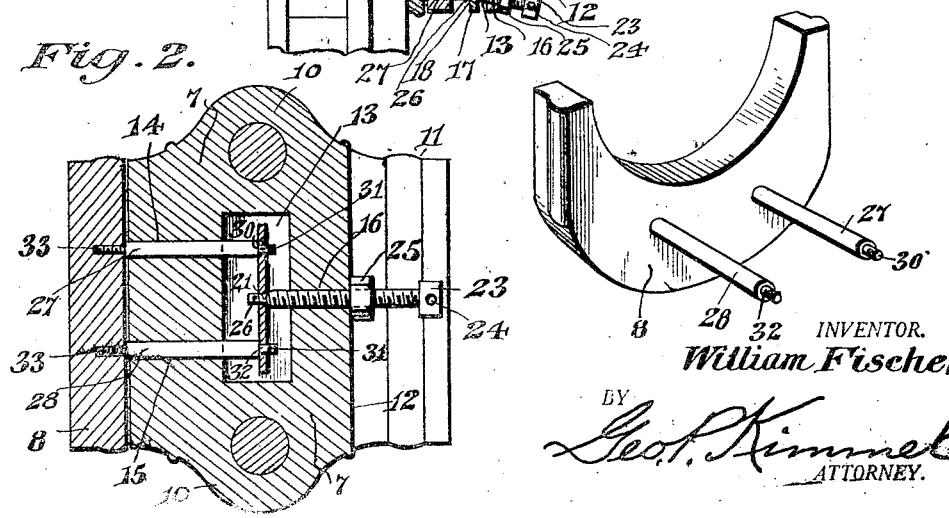
INVENTOR.
William Fischer
BY
Geo. F. Kimmel.
ATTORNEY.

Patented Oct. 21, 1924.

1,512,838

UNITED STATES PATENT OFFICE.

WILLIAM FISCHER, OF ELYRIA, NEBRASKA.

TAKE-UP DEVICE.

Application filed August 7, 1923. Serial No. 656,225.

*To all whom it may concern:*

Be it known that I, WILLIAM FISCHER, a citizen of the United States, residing at Elyria, in the county of Valley and State of Nebraska, have invented certain new and useful Improvements in Take-Up Devices, of which the following is a specification.

This invention relates to a take-up device for eliminating the end play in the crank shaft of a motor vehicle, and is designed primarily for use in connection with the crank shaft of a motor vehicle of the "Ford" type, but it is to be understood that a take-up device in accordance with this invention can be employed in connection with any form of shaft with which it is found applicable, and the invention has for its object to provide, in a manner as hereinafter set forth, a take-up device forming a part of the bearing for the rear end of the shaft and including an adjustable bearing element capable of being shifted to fit tight against the flange on the rear end of the crank shaft for the purpose of not only taking up end play, but also to provide for an increase length of bearing to compensate for the shortening of the bearing, due to the wearing off thereof.

Further objects of the invention are to provide a take-up device, in a manner as hereinafter set forth, which is simple in its construction and arrangement, strong, durable, thoroughly efficient in its use, readily adjusted, conveniently installed, and comparatively inexpensive.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a fragmentary sectional view of an engine of a motor vehicle, showing the adaptation with the crank shaft thereof of a take-up device in accordance with this invention.

Figure 2 is an inverted sectional plan.

Figure 3 is a perspective view of the adjustable bearing and take-up element.

Figure 4 is a perspective view of the thrust plate for the combined bearing and take-up element.

Referring to the drawings in detail, 1 denotes an engine cylinder, 2 the piston, 3 the piston rod, 4 the crank shaft, 5 a portion of the casing of the engine, 6 an upper bearing section, 7 a lower bearing section, and 8 a combined take-up and bearing element supported from the lower bearing section. The bearing sections 6, 7, and element 8 are arranged in operative position with respect to the rear end 9 of the crank shaft 4. The bearing sections 6 and 7 are secured together in a manner as shown in dotted lines, as indicated at 10 in Figure 1. The upper bearing section 6 is of known construction.

The lower bearing section has its forward end reduced, as at 11, thereby providing a shoulder 12, which preferably is inclined as shown in Figure 1. The enlarged portion of the bearing section 7, has its periphery provided with a rectangular pocket 13 and that part of the enlarged portion of the section 7 extending from the pocket 13 to the rear end of the said section 7 is formed with a pair of lengthwise extending channels 14, 15, which open at the rear end of the section 7. That part of the enlarged portion of the section 7 which extends from the pocket 13 towards the forward end of said section, is provided with a bore 16 having the wall thereof threaded, and the said bore 16 is positioned centrally with respect to the channels 14 and 15, or in other words extends in an inclined plane centrally with respect to the planes of the channels 14 and 15. The channels 14 and 15 at their rear ends open into the pocket 13 and the bore 16 at its forward end opens into the pocket 13, and said bore 16 has its forward end open at the shoulder 12. The inclination of the bore 16 is an upward one, that is to say, the bore 16 extends at an inclination upwardly from its forward to its rear end.

Arranged within the pocket 13, is a rectangular thrust plate 17 provided with openings 18, 19 and 20. The opening 19 is positioned centrally with respect to the openings 18 and 20, and extending through the opening 19 is the reduced end 21 of an adjusting screw 22, which has threaded engagement with the wall of the bore 16, and is of a length as to extend a suitable distance forwardly with respect to the shoulder 12. The adjusting screw 22 includes a head 23, having an opening 24 to receive a suitable instrument to facilitate the shifting of the screw 22 when occasion so requires. A lock nut 25 is carried by the screw 22 and which abuts against the shoulder 12 for the purpose of securing the screw 22 in its adjusted position. The reduced end 21 of the screw 22 has extending therethrough a cotter pin 26 for the purpose of connecting the screw 22 to the thrust plate 17. When the screw 22 is adjusted, the thrust plate 17 is shifted rearwardly or forwardly with respect to the section 7, depending in which direction the screw 22 is revolved. If shifted in a clockwise direction the plate 17 is moved rearwardly with respect to the bearing section 7, but if shifted in an anti-clockwise direction the plate 17 is moved forwardly with respect to the bearing section 7.

Mounted in the channel 14 is a slidable thrust rod 27, and mounted in the channel 15 is a slidable thrust rod 28. The thrust rods 27 and 28 are of greater length than the length of the channels 14, 15 and have their forward ends extending into the pocket 13 and their rear ends projecting from the rear end of the bearing section 7. The forward ends of the thrust rods 27, 28, are reduced, as at 30, and the reduced end of the rod 27 extends through the thrust plate 17 and the reduced end 30 of the thrust rod 25 extends through the opening 18 of the thrust plate 17. Cotter pins 31 are employed for connecting the reduced ends 30 of the thrust rods 27 and 28 to the thrust plate 17. The reduced ends 30 of the thrust rods 27, 28, provide each of said rods with a shoulder 32 against which abuts the thrust plate 17.

The rear ends of the thrust rods 27, 28, are reduced, as at 33, and which have threaded engagement with the combined take-up and bearing element 8 which opposes the rear end of the section 7, and the said element 8 is constructed of a plate of substantial thickness and conforming in contour to the rear end of the bearing section 7. The element 8 not only provides means for taking up the end thrust, but also constitutes a bearing for the shaft and acts to increase the length of the bearing section 7 when the latter has become worn, as is obvious.

The element 8 is slidably connected to the bearing section 7 through the medium of the thrust rods 27, 28, thrust plate 17 and adjusting screw 22.

The adjusting screw 22 can be reached by removing the lower crank case cover to enable the adjustment of the screw for the purpose of shifting the element 8 to eliminate end play in the crank shaft and such provision overcomes the necessity of taking the engine apart to eliminate the end play.

Although the thrust rods 27 and 28 are illustrated as having threaded connections with the element 8, yet it is to be understood that said rods can be cast integral therewith, and although the preferred embodiment of the invention is as illustrated and described, yet it is to be understood that changes in the details of construction can be had which will fall within the light of the invention as claimed.

What I claim is:—

1. In a take-up device, the combination with the lower bearing section of a shaft bearing, said section having its periphery formed with a pocket and said section further having a pair of lengthwise extending channels opening into said pocket and at the rear end of said section, and with a threaded bore opening into said pocket and at the forward end of said section, of a combined take-up and bearing element arranged at the rear end of said section and capable of being shifted rearwardly and forwardly with respect thereto, a thrust plate arranged within said pocket, a pair of thrust rods slidably mounted in said channels and connected at one end to said element and at their rear end to the thrust plate, and adjustable means engaging with said bore and connected with said plate for shifting the latter to provide for the adjustment of said element.

2. In a take-up device, the combination with the lower bearing section of a shaft bearing, said section having its periphery formed with a pocket and said section further having a pair of lengthwise extending channels opening into said pocket and at the rear end of said section, and with a threaded bore opening into said pocket and at the forward end of said section, of a combined take-up and bearing element arranged at the rear end of said section and capable of being shifted rearwardly and forwardly with respect thereto, a thrust plate arranged within said pocket, a pair of thrust rods slidably mounted in said channels and connected at one end to said element and at their rear end to and abutting against the thrust plate, and adjustable means engaging with said bore and connected with said plate for shifting the latter to provide for the adjustment of said element, said rods connected with said plate near the ends of the latter and said adjusting means connected with said plate centrally thereof.

3. In a take-up device the combination with the lower bearing section of a shaft bearing, said section having its periphery formed with a pocket and said section further having a pair of lengthwise extending channels opening into said pocket and at the rear end of said section, and with a threaded bore opening into said pocket and at the forward end of said section, of a combined take-up and bearing element arranged at the rear end of said section and capable of being shifted rearwardly and forwardly with respect thereto, a thrust plate arranged within said pocket, a pair of thrust rods slidably mounted in said channels and connected at one end to said element and at their rear end to and abutting against the thrust plate, and adjustable means engaging with said bore and connected with said plate for shifting the latter to provide for the adjustment of said element, the ends of said rods connected with said plate being reduced thereby providing shoulders against which said plate abuts.

In testimony whereof, I affix my signature hereto.

WILLIAM FISCHER.